United States Patent
Bauchspies

(10) Patent No.: US 10,551,931 B2
(45) Date of Patent: Feb. 4, 2020

(54) COMBINATION OF FINGERPRINT AND DEVICE ORIENTATION TO ENHANCE SECURITY

(71) Applicant: IDEX ASA, Fornebu (NO)

(72) Inventor: Roger A. Bauchspies, Gustine, CA (US)

(73) Assignee: IDEX ASA, Fornebu (NO)

( * ) Notice: Subject to any disclaimer, the term of this patent is extended or adjusted under 35 U.S.C. 154(b) by 118 days.

(21) Appl. No.: 15/356,989

(22) Filed: Nov. 21, 2016

(65) Prior Publication Data

US 2018/0144173 A1    May 24, 2018

(51) Int. Cl.
G06F 21/00    (2013.01)
G06F 3/01    (2006.01)
G06F 21/32    (2013.01)

(52) U.S. Cl.
CPC .............. *G06F 3/017* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 6,393,139 B1 | 5/2002 | Lin et al. | |
| 7,035,441 B2 | 4/2006 | Bergenek et al. | |
| 8,682,295 B2 | 3/2014 | Esaki | |
| 9,092,652 B2 | 7/2015 | Marciniak et al. | |
| 9,152,842 B2 | 10/2015 | Vieta et al. | |
| 9,218,544 B2 | 12/2015 | Myers | |
| 9,223,955 B2 | 12/2015 | Lymberopoulos et al. | |
| 2011/0010558 A1* | 1/2011 | Baldan | G06K 9/00087 713/186 |
| 2012/0134549 A1 | 5/2012 | Benkley, III | |
| 2013/0227651 A1* | 8/2013 | Schultz | G06F 21/32 726/4 |
| 2014/0089672 A1* | 3/2014 | Luna | H04L 9/3231 713/186 |
| 2014/0250518 A1* | 9/2014 | Schneider | G06F 21/34 726/9 |
| 2014/0325220 A1* | 10/2014 | Tunnell | G06F 21/00 713/168 |
| 2015/0096002 A1* | 4/2015 | Shuart | G06F 21/32 726/7 |
| 2015/0131878 A1 | 5/2015 | Kim et al. | |
| 2015/0169931 A1 | 6/2015 | Chiang et al. | |

(Continued)

OTHER PUBLICATIONS

Jaechang Shim et al: "A Double-sided Fingerprint Sensing Method", Journal of Korea Multimedia Society, vol. 11, Mar. 3, 2008 (Mar. 3, 2008), pp. 323-330, XP55312780.

(Continued)

*Primary Examiner* — Shin-Hon (Eric) Chen
(74) *Attorney, Agent, or Firm* — Kilpatrick Townsend & Stockton LLP

(57) ABSTRACT

A portable electronic system that includes a biometric imaging device, such as for a fingerprint verification against a trusted pattern template. Security is a factor of a matching process and a quality of the trusted pattern template. By employing a set of user-predictably-influenceable sensor parameters in cooperation with the biometric sensor, it is possible to simply and efficiently enhance security as compared to use of the biometric sensor alone.

8 Claims, 3 Drawing Sheets

(56) References Cited

U.S. PATENT DOCUMENTS

| | | | | |
|---|---|---|---|---|
| 2015/0278497 A1* | 10/2015 | Khan | ...................... | H04M 1/04 |
| | | | | 726/34 |
| 2015/0356338 A1* | 12/2015 | Osborne | ............ | G06K 9/00013 |
| | | | | 382/124 |
| 2016/0180068 A1* | 6/2016 | Das | ........................ | G06F 21/32 |
| | | | | 726/7 |
| 2017/0111328 A1* | 4/2017 | Leon | ........................ | H04L 9/14 |
| 2018/0012227 A1* | 1/2018 | Tunnell | ............ | G06Q 20/40145 |

OTHER PUBLICATIONS

International Search Report for PCT/IB2016/053725 dated Nov. 7, 2016.
Written Opinion of the International Searching Authority for PCT/IB2016/053725 dated Nov. 7, 2016.

* cited by examiner

COMBINATION OF FINGERPRINT AND DEVICE ORIENTATION TO ENHANCE SECURITY

FIELD OF THE INVENTION

The present invention relates generally to automated machine-implemented pattern processing, and more specifically, but not exclusively, to systems, methods, and computer program products for enhanced pattern matching in fingerprint verification systems.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Pattern verification, such as in a context of registration of a trusted fingerprint into a trusted memory of a fingerprint verification system, requires a sufficiently accurate and precise image of the trusted fingerprint (how accurate and how precise are dependent upon design considerations of a particular embodiment). This image may be obtained directly from an imaging sensor. This may be suitable for large area imaging sensors. However, for many applications, the trusted image is reconstituted from image portions of the trusted fingerprint taken from a sensor having a sensing area smaller than the final image. For many mobile applications and electronic platforms, such as smartphones and the like, the use of the small sensor provides a smaller form factor having a lower cost of goods which is important to implementation and adoption. However use of the smaller sensor impacts registration and user experiences during verification.

Any mobile electronic platform having a fingerprint verification system typically includes a registration system that establishes and writes one or more trusted images into a trusted database/memory. Test fingerprints are compared against the trusted image(s) using a matching engine that matches features of interest from the test fingerprint against features of interest from the trusted image(s). A quality of the test image and of the trusted images impact the user experience.

Many systems using a small area sensor therefore register a single finger using multiple impressions. An initial impression of an image portion always provides completely unique information of the larger image to be reconstituted. However, subsequent impressions have varying usefulness depending upon whether the user provides an impression that partially overlaps and partially presents new image data. The user has difficulties in placing a finger for multiple impressions to ensure only unique partial overlapping data is presented with each impression, particularly over a breadth of an entire fingerprint pattern. It is too easy for a user to provide subsequent images with too much overlap or with too little or no overlap. A user does not know when or if they have provided enough sufficiently overlapping image impressions that map enough of the total fingerprint to provide an end product that provides the user with an easy-to-use verification system.

From a perspective of a user, this can become very challenging as the sensor imaging area decreases. Registration systems may not provide feedback to the user of a status of the finger area mapping process. An accuracy of the registration process is degraded when the set of image portions are unable to produce the needed larger image.

Systems for processing image portions of a pattern may sometimes be desirably implemented using limited computing and memory resources. As an active area of a sensor decreases, a greater number of image portions are needed to cover any particular area of the pattern. Managing and processing multiple portions of a pattern can sometimes negatively impact performance, unless other systems and methods are implemented to counter this impact which may add additional complexity and costs.

Biometric systems associated with devices sometimes add to a complexity or ease of use of the device. Particularly as many biometric systems add delay and confusion to registration of trusted patterns to enhance security. Some user's may resist adoption or use of such biometric systems. There is a desire to provide easy ways to enhance biometric security.

Some devices, including portable electronic devices, may not include biometric imaging devices due to cost, size, power, or other reason. Some of these verify access by use of a password or PIN to access the device or services enabled by the device.

Some portable electronic devices may be unable, or do not wish, to support a conventional user interface as part of the portable electronic device. In such cases, it would be desirable to provide some type of secure interface mechanism.

What is needed is a system and method for adding/substituting options with pattern matching systems.

BRIEF SUMMARY OF THE INVENTION

Disclosed is a system and method for adding/substituting options with pattern matching systems, with some embodiments and implementations offering enhancements to existing pattern matching systems. The following summary of the invention is provided to facilitate an understanding of some of the technical features related to enhanced pattern matching, and is not intended to be a full description of the present invention. A full appreciation of the various aspects of the invention can be gained by taking the entire specification, claims, drawings, and abstract as a whole. The present invention is applicable to other biometric systems in addition to fingerprint scanners and to other pattern matching systems in addition to biometric systems.

An embodiment of the present invention may include a portable electronic device that includes a biometric imaging device, such as for a fingerprint verification against a trusted pattern template. Security is a factor of a matching process and a quality of the trusted pattern template. By employing a set of user-predictably-influenceable sensor parameters in cooperation with the biometric sensor, it may be possible to simply and efficiently enhance security as compared to the biometric sensor alone.

An embodiment of the present invention may include a portable electronic device that lacks such a biometric imaging device but for which an physical input/output interface (e.g., a keypad and/or a touchscreen and supporting components) is not provided either because it is not possible or it is not preferred. Some personal identification, bank cards, credit cards, electronic security keys may fall into this category. By employing a set of stand-alone user-predictably-influenceable sensor parameters, it may be possible to simply and efficiently provide security without a mechanical input/output interface and/or without biometric imaging devices.

A system, including set of sensors including a first user-predictably-influenceable sensor producing a set of sensor outputs responsive to an interaction with the device by a user; a processor; and a computer-readable storage medium, coupled to said set of sensors and to said processor, including a trusted template having a trusted set of sensor outputs as a template element and a set of processor-executable instructions that cause, when executed by said processor, said processor to: compare said set of sensor outputs with said trusted set of sensor outputs using a sensor output match process; and establish said user as a sensor-verified user when said sensor output match process matches said trusted set of sensor outputs to said set of sensor outputs within a predetermined sensor margin of match.

A method implemented by a processing device, including a) receiving, from a set of sensors including a first user-predictably-influenceable sensor, a set of sensor outputs responsive to an interaction with the processing device by a user; b) comparing said set of sensor outputs with a trusted set of sensor outputs using a sensor output match process with said trusted set of sensor outputs accessed from a trusted template retrieved from a trusted memory; and c) establishing said user as a sensor-verified user when said sensor output match process matches said set of sensor outputs to said trusted set of sensor outputs within a predetermined sensor margin of match.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 3 illustrates an initial orientation for the representative system of FIG. 2;

FIG. 4 illustrates a second orientation for the representative system of FIG. 2;

FIG. 5 illustrates a third orientation for the representative system of FIG. 2; and FIG. 6 illustrates a fourth orientation for the representative system of FIG. 2.

DETAILED DESCRIPTION OF THE INVENTION

Figure 1:
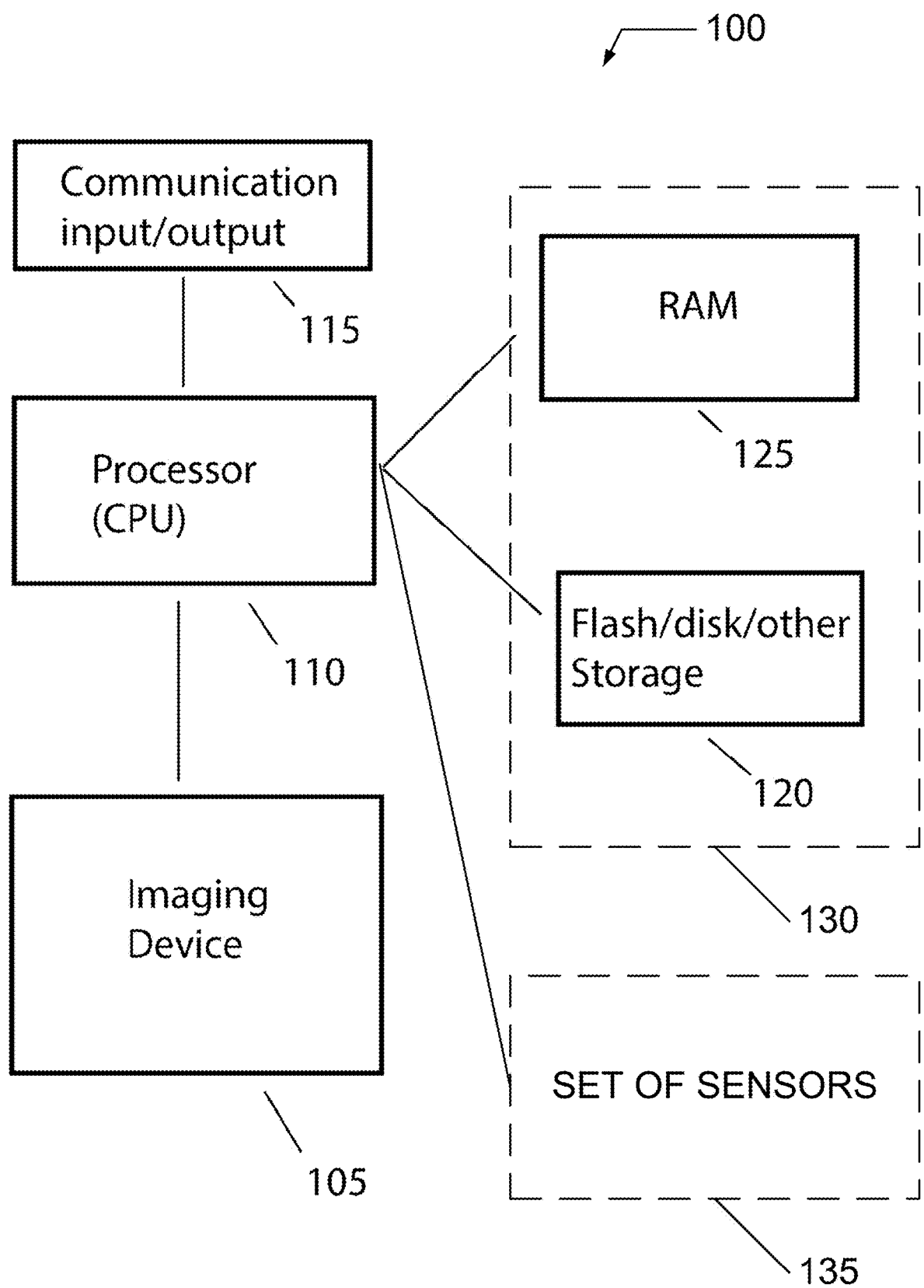
FIG. 1 illustrates a block schematic diagram of an embodiment for a pattern verification system.

Embodiments of the present invention provide a system and method for adding/substituting options with pattern matching systems. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

As used herein, the terms "match," "matching," and "matches" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression. A match does not require 100% commonality of features between the first and second patterns. One hundred percent, and nearly 100% (for example 95% commonality—depending upon application), commonality is referred to as a duplicate image. This results when the user places the same portion of the same finger on the sensor from two or more impressions. Sometimes a match is a determination from a matcher process or matcher engine, which can have a particular special meaning. Some embodiments of the present invention include just such a matcher process. However, the present invention is not constrained to determining matches in this fashion; the present invention includes use of an alignment engine for evaluating the condition of a match or a non-match between comparisons of a set of patterns.

As used herein, the terms "correlate," "correlating," and "correlated" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression without a match between the first pattern and the second pattern. Correlation is found by matching intermediate patterns that provide a bridge between the first pattern and the second pattern. For example, a second pattern may not match the first pattern, but may match a third pattern, with the third pattern matching the first pattern. Correlation may be found by one or more intermediate matches between the second pattern and the first pattern.

As used herein, the terms "near realtime" refers to a practicality of a time delay introduced, by automated data processing or data transmission, between an occurrence of an event of receiving a pattern impression from application of a pattern source to a pattern impressioner (e.g., an imager to create a bitmap image of a portion of a pattern associated the pattern source) and the subsequent processing of data for that pattern impression (e.g., a bitmap image), such as for display, feedback, or control purposes. Depending upon a processing speed, it may be possible to make multiple pattern impressions before a first pattern impression is processed. Some embodiments of the present invention process serial pattern impressions from a user in realtime or near realtime which may be considered equivalent when the processing delay is imperceptible to a user. For realtime, and near realtime embodiments, it is considered that pattern impressions are taken and processed serially, that is an impression and processing/feedback is provided before a next following pattern impression is processed.

In general, a pattern source (e.g., a finger) may include a pattern (e.g., a fingerprint). For a system that does not process the pattern (fingerprint) directly, the system may process a representation (e.g., a pattern map) of the pattern (fingerprint). When a user uses an impressioner (e.g., places a pattern source (finger) on a sensor or imager or other impression producing structure), the system may produce an impression (e.g., an image) of a portion of the pattern (fingerprint) of the pattern source (finger) of the user. An embodiment of the present invention may enhance or alter this by including other, or alternative, sensor input as part of the trusted/registered pattern source to be used for verification. These additional/alternative sensor input represent one or more static sensor states (sometimes a proper sequence for the states) and are not dynamic biometric evaluations, that is use of a biometric signature that is defined by biometric variations in motor skills of the operator. Sometimes these may include unique neuro-musculature patterns (e.g., velocity parameters when writing a signature) specific to an individual and may thus be used as a dynamic biometric pattern that includes motion. These sensor inputs are a different pattern source that does not necessarily require any "biometric" evaluation. As noted, a combination of biometric and non-biometric input may improve over a pure biometric solution while providing advantages of a biometric solution. After registration and during operation when receiving pattern information, the system and method may not, and typically does not, have a priori knowledge that an incoming set of pattern information is in fact from the pattern. To reflect this, any pattern providing the incoming set of pattern information may be referred to as a pattern-under-test. Impressions (images) and other sensor input may be collected and evaluated, in bulk or in realtime or in near realtime from one or more patterns-under-test depending upon a particular implementation. The additional non-biometric sensor input may be able to simply and efficiently enhance many current and future biometric systems, including many dynamic and evolvable biometric systems. An example of an evolvable system may be found in U.S. patent application Ser. No. 15/265,539 which is hereby expressly incorporated in its entirety by reference thereto for all purposes.

FIG. 1 illustrates a block schematic diagram of an embodiment for a pattern registration system 100. System 100 includes an imaging device 105, one or more processors 110, an input/output (I/O) system 115, a nonvolatile memory 120 and a RAM memory 125, with memory 120 and memory 125 collectively defining a memory system 130, and a set of sensors 135. System 100 is described, in the disclosed embodiment, as a fingerprint registration system that may be used as a pattern (e.g., fingerprint) verification system. In a fingerprint verification system, the system attempts to measure a correspondence between a pair of fingerprints (one-on-one) in order to establish, within some level of confidence, whether one pattern source (a finger) is the same or sufficiently close to another pattern source (a finger) that produces the other fingerprint. This is contrasted with an identification system that determines which pattern source (which finger belonging to which person) generated a particular fingerprint. A verification system may be used as an identification system when a decrease in power/speed is acceptable, given fixed resources. A verification system performs better as the quality of the registered images improves.

System 100 may function as a basic computer in implementing the present invention for accessing and processing fingerprints, fingerprint images, and sets of curves derived from a fingerprint as further described below. Each processor 110 may include one or more central processing units (CPUs), selected from one or more of an x86, x64, ARM, or the like, architectures, connected to various other components, such as by a system bus. In a case with multiple processors 110 and/or multiple CPUs, one processor 110 may support a first subset of functions (e.g., imaging device 105) for collecting a biometric impression and another processor 110 may support a second subset of functions (e.g., set of sensors 135) for collecting a different set of data than from device 105. These processors 110 may coordinate with each other, or a third processor 110 may receive input from the other processors 110 and decide upon a pattern match state.

Imaging device 105 produces an image of a fingerprint (an impression from an impressioner for example); either directly (e.g., it is a sensor or imager for a pattern source or an artifact from a pattern source) or it accesses a data structure or memory to obtain the image. The image may be of all or a portion of an entire fingerprint. Sometimes a portion of a fingerprint image may appear to be a set of discrete curves. System 100 is a computing system (e.g., an embedded computing system, a general purpose computing system, a special purpose computing system, combinations thereof, including a stored program computing platform with a processor and a coupled memory storing executable instructions) having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from device 105. In some cases, device 105 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

Set of sensors 135 represent a range of different possible structures for receiving alternative/additional user input during use of system 100. It is sometimes the case that system 100 is implemented by a portable electronic device such as a smart phone which includes many sensing systems. Those sensing systems which may have sensor output values that are user-predictably-influenced are candidates for inclusion of set of sensors 135. It may be the case that one or more sensing systems are supplemented or replaced to include a desired set of sensors 135. Not all sensors included with system 100 need be used for, or are necessarily candidates for, set of sensors 135. It is also possible that in some embodiments some or all of the sensors of set of sensors 135 may not be disposed within a same physical housing or device that supports imaging device 105. One or more sensors of set of sensors 135 could be included within one or more independent structures, with each sensor or subset of sensors communicating (wired or wirelessly) with other components of system 100.

An advantage of some embodiments of the present invention may be that it may not be possible for a third-party non-user to know which sensing systems are implicated in any particular solution increasing the security of the system. That is, when a security system includes a single sensing solution, the third-party non-user unambiguously knows which sensing system must be addressed and defeated.

For a set of sensors, there may be many different permutations of combinations of the various possible sensing systems which increases a resistance of system 100 to unauthorized use. This is without regard to the number of possible inputs from any particular sensor used in set of sensors 135.

Even more advantageously, some of the inputs to some of the sensors of set of sensors 135 may not be apparent to the third-party non-user by casual observation. And it may be possible for some users to mask input to set of sensors 135 by performing extraneous device manipulations that are not registered by system 100 but for which the third-party non-user will not necessarily know are not recognized inputs to the system.

Associated with the potential inclusion of a sensor within possible sensors for set of sensors 135 is the concept of user-predictably-influenceable sensor output. That is, a user must be able to both influence a sensor output, and must be able to predictably and controllably influence the sensor output. For example, some systems may include one or more of a barometer, a hygrometer, and/or a thermometer. For many embodiments, these sensors may not be suitable as it is difficult, if possible, for a user to predictably and controllably alter these values, especially within a time allocated for many pattern verification systems (typically measured within a few seconds).

Even for a sensor which a user may influence its output, that influence must be predictable and controllable within that allocated time window. As discussed further below, a user-predictably-influenceable sensor may provide a much finer output response than a user could predictably influence/control. It is possible in such cases to define discrete coarse ranges for the finer output values.

In a representative system described herein, a device orientation may be measured by a sensor in set of sensors 130. Many orientation systems may be able to provide a rotational positional output in five degree increments. However, it may not be possible for many users to differentiate between holding a device at 50 degrees versus 45 or 55 degrees. A solution is to define discrete ranges that may be differentiated (in predictable ways) by the user. For example, it may be possible as in the example to provide eight orientation options and the user must come within 22.5 degrees of a particular desired orientation in each discrete range. When a particular implementation does not work for the target audience, it may be possible to widen the range (say implementation of four ninety degree ranges or two one hundred eighty degree windows). When not possible or feasible for the intended users, that sensor system may not be implemented in set of sensors 135.

Sensors that are included in some smart phones may include, in addition to biometric imaging device 105, an imager (e.g., a camera), a three-axis gyro, a compass, an accelerometer, a proximity sensor, an ambient light sensor, a magnetometer, Hall effect, geolocation (global positioning system (GPS) or cell tower localization using localization-based services, multilateration of radio signals or Global System for Mobile Communications (GSM)), and other environmental or operational sensors. As noted herein, one or more of these sensing systems may be included within set of sensors 135, with the proviso that appropriate discrete range windows may be implemented for usability.

It should be noted that in some cases it may be possible to employ sensor output in either relative mode or absolute mode. For a system using an orientation sensor to sense orientations of: zero degrees, ninety degrees, negative forty-five degrees, and one hundred thirty five degrees rotation (as illustrated and described below), a relative mode will always use a current orientation as matching the initial orientation direction (zero) and then determine whether subsequent orientations match the trusted pattern relative to the initial direction. An absolute mode would require that the initial orientation be, in fact, zero degrees according to the orientation sensing system.

In some implementations, imaging device 105 may be suitable for dual-use. That is, not only collecting information on the pattern, but also measuring an orientation of the application of the pattern source to imaging device 105. In some implementations, it was desired that system 100 be robust and ignore orientation variations during pattern collection and evaluation of patterns-under-test. A match engine that has a capability to evaluate particular orientations relative to imaging device 105 may also be used as a sensor in set of sensors 135. That is, not only must an unknown user provide the correct pattern source to imaging device 105 for verification, an embodiment may require that the correct pattern source be applied at a particular correct orientation (or correct sequence of correct orientations) to imaging device 105 for verification.

This may be true for many different types of biometric pattern scanners or collectors. In a case where imaging device 105 includes a two-sided "pinch" sensing region to measure two patterns (e.g., two different fingerprints) at the same time, further permutations may be implemented to measure not purely the pattern images of two distinct pattern sources, but a sequence of varying inputs. For example, combining orientation changes with a pinch pattern sensor, a user may vary which finger in juxtaposed against the thumb as the user changes the orientation. That is, at the initial orientation the thumb and forefinger may be juxtaposed and at the next orientation the trusted pattern may include not only a ninety degree rotation but also that the thumb and middle finger be juxtaposed.

In another case, there may be more than a single device 105, such as another type of biometric impressioner for voice recognition, iris scanning, and the like. These additional devices may also be used in combination with other devices 105 (e.g., a fingerprint imaging device) and sensors from set of sensors 135.

An operating system runs on processor 110, providing control and coordinating the functions of the various components of the system. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that are moved into and out of memory. These sets of instructions, when executed by processor 110, perform the methods and automated machine-implemented processes described herein. Device 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices may also be connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. The system may contain a removable memory component for transferring data, for example images, maps, instructions, or programs.

In use, system 100 processes a set of pattern images from a pattern source (e.g., a fingerprint) to produce an image of the pattern source. Optionally, system 100 provides the user with feedback regarding a status and/or quality of the image production to aid in realtime impression gathering. Verification of the set of pattern images may be qualified by, or supplemented by, input from set of sensors 135. Alternatively, pattern matching may include not only a successful match of the set of pattern images against one or more trusted images of the trusted template, but a successful pattern match may further include system 100 processing a set of pattern input from set of sensors 135 (e.g., an orientation or proper sequence of orientation changes). The pattern matching of pattern images and pattern input may occur serially (e.g., matching the sensor input before checking the biometric or vice-versa) or may occur in parallel. When in parallel, the systems may provide a synergistic cooperation between the biometric system and the non-biometric sensor system.

In general, operation may include a trusted registration of a trusted template having template elements with trusted pattern elements from one or more trusted pattern representations of a pattern (e.g., a fingerprint from one finger of a user and input from one or more sensors) made available in a trusted memory. One or more of these trusted pattern elements may include one or more specific patterns of the non-biometric sensors. Verification may be premised on satisfaction of either or both of pattern image input and pattern sensor input.

In some instances, system 100 may not include an input/output system, or may include a simple I/O system such as a simple pinpad or the like, and/or may not include a biometric imaging device/imager. Some of these systems may desirably wish to provide some security or enhance the available security without including a biometric imaging device. An implementation of the present invention using an appropriate set of sensors may improve the available security irrespective of a security level of the previous unenhanced system.

Figure 2:
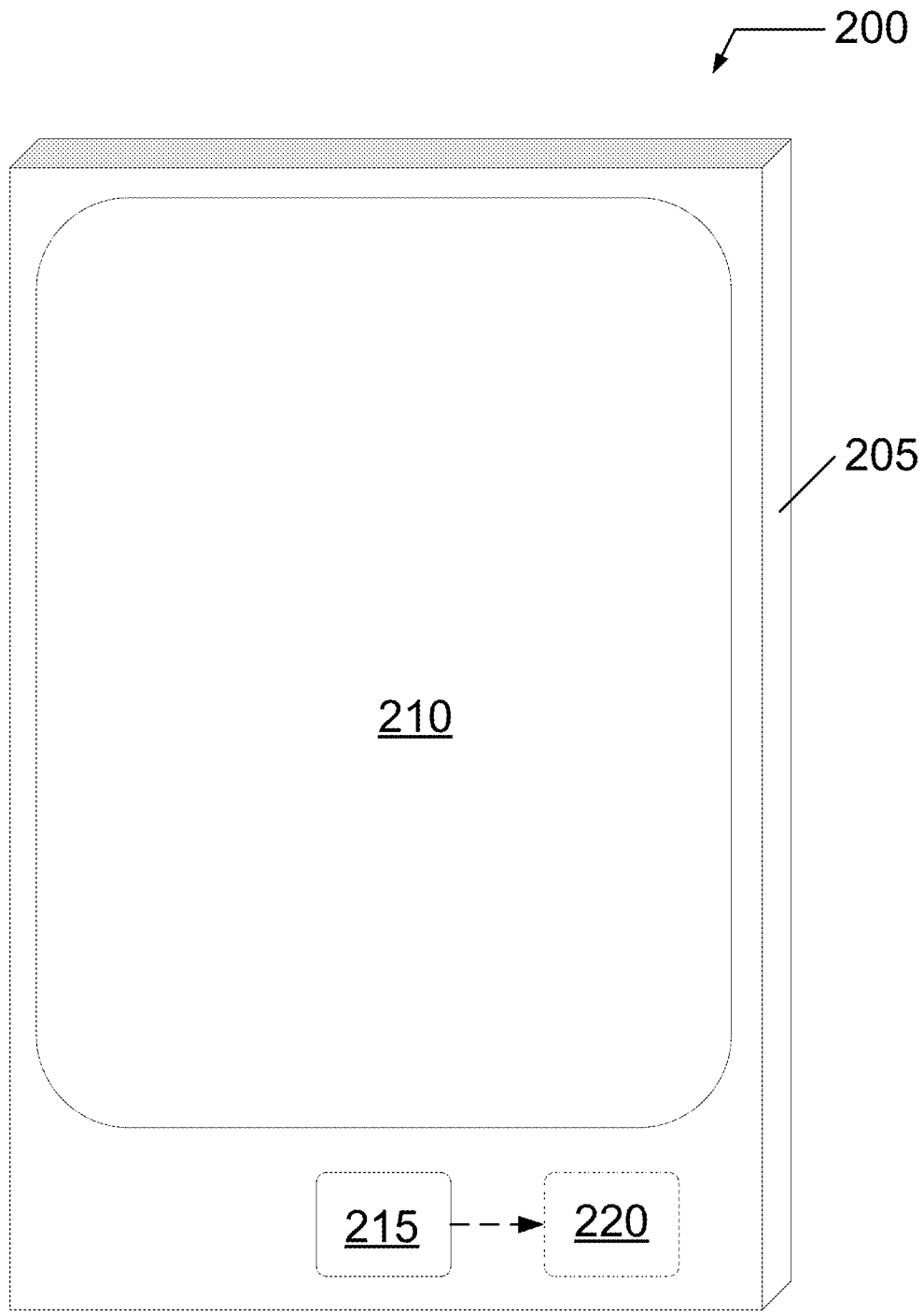
FIG. 2 illustrates a representative device implementing the pattern verification system of FIG. 1.

FIG. 2 illustrates a representative device 200 implementing the pattern verification system of FIG. 1. Device 200 includes a housing 205 supporting a touch-responsive screen 210, a fingerprint scanner 215, and other electronics 220 identified in FIG. 1 including processor 110 and set of sensors 135. During registration of a trusted pattern, not only is a trusted pattern source (fingerprint) of an authorized user registered into a trusted template, various identified trusted sensor input ranges, which may include a pattern of a sequence of one or more sensors) is also included within the trusted template as template elements.

In this example, once registered into the trusted template, verification will require that the total trusted pattern be evaluated against a pattern-under-test. The pattern-under-trust includes both biometric pattern information but also additional non-biometric pattern information from set of sensors 135. Adding an additional test using additional independent variables has the result of invariably increasing security over either of the systems alone. Since many electronic devices already include a suite of sensors, proper selection and use of some of these as set of sensors 135 adds little if any cost to the system while potentially achieving greatly enhanced security in a simple and reliable manner. Particularly when some sensors that may be suitable may be implemented as complete stand-alone embedded chip solution.

In the example below, not only is a fingerprint registered into the trusted template, but the trusted template further includes discrete trusted template elements regarding non-biometric sensor window ranges for information from set of sensors 130 included within electronics 220. Specifically, an absolute orientation pattern is registered into the trusted template. That absolute orientation pattern includes, in sequence: 1) vertical, 2) horizontal ninety degree clockwise from vertical, 3) tilted forty-five degree counter clockwise from vertical, and 4) tilted one hundred thirty five degrees clockwise from vertical.

Figure 3:
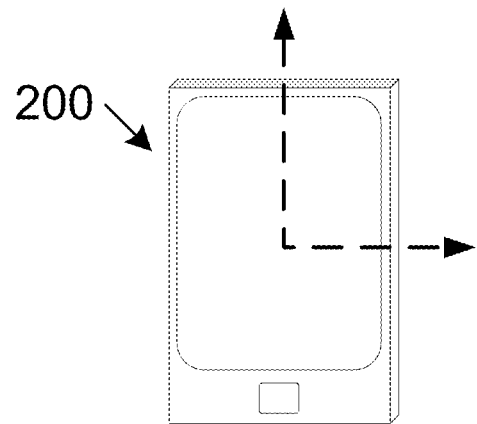
FIG. 3-FIG. 6 illustrate a sequence of device manipulations producing a set of sensor inputs from a device orientation sensor during four input phases.
Figure 4:
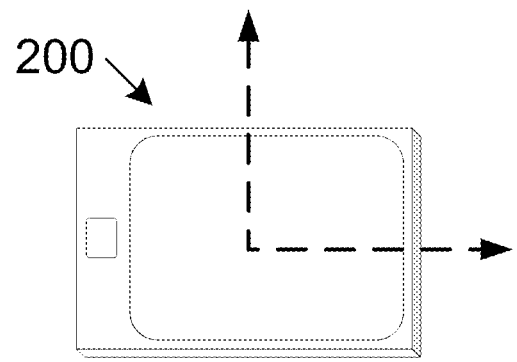
Figure 5:
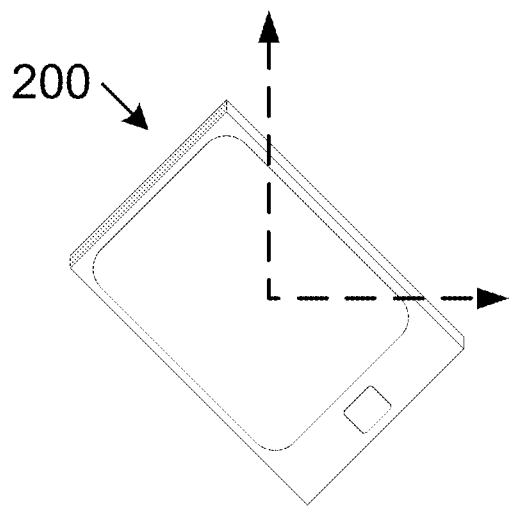
Figure 6:
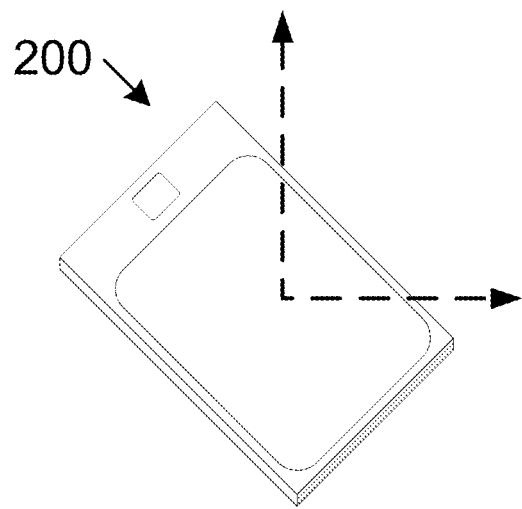

FIG. 3-FIG. 6 illustrate a sequence of device manipulations producing a set of sensor inputs from a device orientation sensor during four input phases described above: FIG. 3 illustrates the initial vertical orientation for device 200; FIG. 4 illustrates the horizontal ninety degree clockwise from vertical orientation for device 200; FIG. 5 illustrates the tilted forty-five degree counter clockwise from vertical orientation for device 200; and FIG. 6 illustrates the tilted one hundred thirty five degrees clockwise from vertical orientation for device 200.

In this implementation, unless both the fingerprint and the sequence of orientations match, the user will not be verified for use with device 200. In some embodiments, it may not require a sequence of orientations, just requiring that device 200 be held in a particular trusted orientation when evaluating the fingerprint enhances security.

As more sensor options are added, the enhancement increases. For example, as illustrated, only variations of a roll orientation about the X-axis are illustrated. And those roll orientations are quantized at forty five degree values making eight different values for roll input An orientation sensor typically may also measure rotations about the y-axis (pitch) and rotations about the z-axis (yaw). In an event a user could reliably and controllably manipulate correct rotations of all three axes in forty-five degree windows, there would be 512 different options for each orientation phase. In some cases it may be necessary or desired to limit the number of variations or allow this to be a configuration option. Even limiting the options per orientation phase to four ninety degree windows, there would be 64 different options for each orientation phase.

An embodiment of the present invention may include the set of sensors (including one user-predictably-influenceable sensor—these sensors preferably exclude biometric impressioners used for biometric pattern impressioning) that produces a set of sensor inputs as the user interacts with the system. A trusted sensor pattern is part of the trusted template stored in a trusted memory and the user will have limited access to the device unless and until the user is verified against the trusted template. As illustrated, the verification may be implemented in several different ways.

In one way, the system does not include any other verification mechanism and relies solely on the set of sensor information. While there may be many ways to offer security for this embodiment, one way is to include a sequence of interactions with the device, as measured by the set of sensors. The measured interactions are matched against sensor parameters stored as part of the trusted template using a sensor output match process.

The sensor output match process uses a special sensor output matching engine to compare the measured sensor value(s) against the appropriate template element using a margin of error appropriate for the sensor and parameter (a sensor margin of error or margin of match). For example, for the orientation sensor having eight discrete "values" of 45 degree increments, the match engine compares the measured value against the template value±22.5 degrees to establish a match. Matching sensor value(s) within the sensor margin of match establishes the user as a sensor-verified user. When sensor verification is the exclusive security modality, then sensor-verification is tantamount to full user-verification allowing additional enhanced access to the device unavailable to an unverified user.

Some embodiments may use multiple sensors in the set of sensors (orientation and compass heading for example), which may be important with a sensor-only solution that multiple sensors be employed. That is, the user may be required to face North while holding the device unrotated about any of the measured axes. For an enhancement, it may be that the device will respond to orientation changes only when the user faces a particular direction (e.g., North). The user thus may, when stored in the trusted template, be required to face North with the device vertical and then rotate it clockwise horizontal. Then the user may then need to face West and reorient the device to the vertical orientation. Other possibilities are of course possible. Addition of other sensors within the set of sensors may provide a greater number of options.

Another embodiment may employ a biometric impressioner (collecting biometric pattern information) along with a sensor solution. In a conventional biometric solution, during use after registration, the user uses the impressioner to collect biometric pattern information and that information is compared against template elements of the trusted template using a biometric match process. In those systems, a match within a biometric margin of match resulted in a biometric-verification of the user. And as that had been the only verification, the user became verified and was given enhanced permissions for accessing the device based exclusively on the biometric information.

However, when used with the sensor verification system, in some implementations the user must be both biometric-verified and sensor-verified before the user is truly verified for enhanced permission(s). Different embodiments may implement these processes in various ways as noted herein (e.g., in parallel or in series with one test preceding another). Other less secure, but perhaps more user-convenient solutions, may allow for full verification upon either sensor-verification or biometric-verification, using a configuration option.

Using the compass/orientation example above with the addition of a biometric impressioner, a simple solution would be that the user is verified only when holding the device with a particular orientation at the proper heading (sensor-verification) and when the fingerprint matches (biometric-verification). In some cases, the fingerprint image is only accessed after the sensor-verification is complete, and sometimes this is reversed, while they may also be a concurrent test as noted.

When the template element includes a sequence of sensor input at each of multiple phases, for each phase there may be corresponding requirement for a biometric-verification to be successful as well as the sensor-verification for each phase. For a fingerprint reader, different fingers may be needed for the different phases.

Another embodiment may employ a mechanical interface, such as a keypad, pinpad, touch-responsive screen, some other Input/output system, or the like. This mechanical interface may be used for interface-verification in cooperation with not only the sensor-verification, but also biometric-verification when available. Interface-verification includes an interface comparison against interface template elements within an interface margin of match. Different implementations may require one, some, or all of the different verification states to be satisfied before providing the user with enhanced permission(s), sometimes with an identified order or concurrency specified for the different verification options.

An embodiment may be compatible with user cases where the trusted registration mode is carried out by connecting the device containing the fingerprint sensor to another intelligent system, for example: a) a bank card, smart card or identity card containing a fingerprint sensor where trusted registration mode is carried out in a secure office with the card containing the fingerprint sensor possibly linked to a computer and supervised by an official, and b) a device containing a fingerprint sensor that does not have any kind of graphical user interface/screen/user feedback mechanism is connected to a computer/mobile phone/portable electronic device during trusted registration mode, among other possible uses. Moreover, those skilled in the art will appreciate that the above described methods may be practiced using any one or a combination of computer processing system configurations, including, but not limited to, single and multi-processer systems, hand-held devices, programmable consumer electronics, mini-computers, or mainframe computers. The above described methods may also be practiced in distributed computing environments where tasks are performed by servers or other processing devices that are linked through a one or more data communications networks. In a distributed computing environment, program modules may be located in both local and remote computer storage media including memory storage devices.

Also, an article of manufacture for use with a computer processor, such as a CD, pre-recorded disk or other equivalent devices, could include a computer program storage medium and program mechanisms recorded thereon for directing the computer processor to facilitate the implementation and practice of the above described methods. Such devices and articles of manufacture also fall within the spirit and scope of the present invention.

The invention can be implemented in numerous ways, including for example as a method (including a computer-implemented method), a system (including a computer processing system, general purpose, special purpose, hybrid, embedded, and the like), an apparatus, a computer readable medium, a computer program product, a graphical user interface, a web portal, or a data structure tangibly fixed in a computer readable memory. Several embodiments of the present invention are discussed herein. The appended drawings illustrate only typical embodiments of the present invention and therefore are not to be considered limiting of its scope and breadth. The system, methods, and computer-program products have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

System 100 includes a computer program product or software that is stored on or in a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, the software can include a plurality of modules for performing system tasks such as performing the methods previously described herein. A processor interprets instructions to execute the software, as well as, generates automatic instructions to execute software for system responsive to predetermined conditions. Instructions from both the user interface and the software are processed by the processor for operation of system 100. In some embodiments, a plurality of processors can be utilized such that system operations can be executed more rapidly.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A system, comprising:
    a set of sensors including a first user-predictably-influenceable sensor producing a set of sensor outputs responsive to an interaction with the system by a user, the set of sensors further including a biometric imaging device capturing a set of biometric pattern information;
    a processor; and
    a computer-readable storage medium, coupled to said set of sensors and to said processor, including a trusted template having a trusted set of sensor outputs as a template element, the trusted set of sensor outputs including a trusted set of biometric pattern information, and a set of processor-executable instructions that cause, when executed by said processor, said processor to:
        compare said set of sensor outputs with said trusted set of sensor outputs using a sensor output match process; and
        establish said user as a sensor-verified user when said sensor output match process matches said trusted set of sensor outputs to said set of sensor outputs within a predetermined sensor margin of match, and in a manner that indicates that a biometric pattern source has been applied to the biometric imaging device at a predetermined sequence of correct orientations.

2. The system of claim 1 wherein said set of sensors includes an orientation sensor, wherein said set of sensor outputs measures rotations of the system about one or more of an x-axis, a y-axis, and a z-axis, and wherein said trusted set of sensor outputs includes one or more predetermined orientations of the system.

3. The system of claim 2 further comprising a mechanical interface capturing a set of mechanical input pattern information from said user wherein said trusted template includes a trusted set of mechanical input pattern information, and wherein said set of processor-executable instructions further cause, when executed by said processor, said processor to:

compare said set of mechanical input pattern information with said trusted set of mechanical input pattern information using an interface pattern information match process;

establish said user as an interface-verified user when said interface pattern information match process matches said trusted set of mechanical input pattern information with said set of mechanical input pattern information within a predetermined interface margin of match; and establish said user as a verified user when said user has been established as each of said sensor-verified user, and said interface-verified user.

4. The system of claim 3 wherein said set of processor-executable instructions further cause, when executed by said processor, said processor to:

perform said comparisons using said sensor output match process and said interface pattern information match process concurrently with one other.

5. The system of claim 1 further comprising a mechanical interface capturing a set of mechanical input pattern information from said user wherein said trusted template includes a trusted set of mechanical input pattern information, and wherein said set of processor-executable instructions further cause, when executed by said processor, said processor to:

compare said set of mechanical input pattern information with said trusted set of mechanical input pattern information using an interface pattern information match process;

establish said user as an interface-verified user when said interface pattern information match process matches said trusted set of mechanical input pattern information with said set of mechanical input pattern information within a predetermined interface margin of match; and establish said user as a verified user when said user has been established as both said sensor-verified user and said interface-verified user.

6. The system of claim 5 wherein said set of processor-executable instructions further cause, when executed by said processor, said processor to:

perform said comparisons using said sensor output match process and said interface pattern information match process concurrently with each other.

7. The system of claim 1 wherein the said set of processor-executable instructions further cause, when executed by said processor, said processor to:

compare said set of biometric pattern information with said trusted set of biometric pattern information using a biometric pattern information match process;

establish said user as a biometric-verified user when said biometric pattern information match process matches said trusted set of biometric pattern information with said set of biometric pattern information within a predetermined biometric margin of match; and establish said user as a sensor-verified user when said sensor output match process matches said trusted set of sensor outputs to said set of sensor outputs within a predetermined sensor margin of match, and in a manner that indicates that a biometric pattern source has been applied to the biometric imaging device at a predetermined sequence of correct orientations, and when said user has been established as said biometric-verified user.

8. A method implemented by a processing device, comprising:

a) receiving, from a set of sensors including a first user-predictably-influenceable sensor, the set of sensors further including a biometric imaging device capturing a set of biometric pattern information, a set of sensor outputs responsive to an interaction with the processing device by a user;

b) comparing said set of sensor outputs with a trusted set of sensor outputs using a sensor output match process with said trusted set of sensor outputs accessed from a trusted template retrieved from a trusted memory, the trusted set of sensor outputs including a trusted set of biometric pattern information; and c) establishing said user as a sensor-verified user when said sensor output match process matches said set of sensor outputs to said trusted set of sensor outputs within a predetermined sensor margin of match, and in a manner that indicates that a biometric pattern source has been applied to the biometric imaging device at a predetermined sequence of correct orientations.

* * * * *